US012628232B2

(12) United States Patent
Zhang et al.

(10) Patent No.: US 12,628,232 B2
(45) Date of Patent: May 12, 2026

(54) METHODS AND SYSTEMS FOR BEAM MANAGEMENT IN WIRELESS NETWORKS

(71) Applicant: ZTE Corporation, Shenzhen (CN)

(72) Inventors: Nan Zhang, Shenzhen (CN); Wei Cao, Shenzhen (CN); Jianwu Dou, Shenzhen (CN); Jianqiang Dai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 379 days.

(21) Appl. No.: 18/471,716

(22) Filed: Sep. 21, 2023

(65) Prior Publication Data

US 2024/0090064 A1      Mar. 14, 2024

Related U.S. Application Data

(63) Continuation of application No. PCT/CN2021/084855, filed on Apr. 1, 2021.

(51) Int. Cl.
*H04W 76/19* (2018.01)
*H04L 5/00* (2006.01)

(52) U.S. Cl.
CPC ........... *H04W 76/19* (2018.02); *H04L 5/0048* (2013.01)

(58) Field of Classification Search
CPC .............................. H04W 76/19; H04L 5/0048
See application file for complete search history.

(56) References Cited

U.S. PATENT DOCUMENTS

| | | | | |
|---|---|---|---|---|
| 2013/0077569 | A1* | 3/2013 | Nam | H04W 52/288 |
| | | | | 370/328 |
| 2019/0253127 | A1* | 8/2019 | Kang | H04L 5/0053 |

| | | | | |
|---|---|---|---|---|
| 2019/0260544 | A1* | 8/2019 | Dou | H04L 5/0048 |
| 2020/0015200 | A1 | 1/2020 | Vilaipornsawai et al. | |
| 2020/0100154 | A1* | 3/2020 | Cirik | H04B 7/06964 |
| 2020/0106645 | A1* | 4/2020 | Tsai | H04B 7/022 |
| 2020/0153500 | A1* | 5/2020 | Kim | H04B 7/18541 |
| 2020/0314711 | A1* | 10/2020 | Basu Mallick | H04W 36/00838 |
| 2020/0351039 | A1* | 11/2020 | Zhou | H04L 5/0023 |
| 2021/0076391 | A1* | 3/2021 | Davydov | H04L 5/0057 |
| 2021/0194756 | A1* | 6/2021 | Babaei | H04B 7/06964 |
| 2021/0235500 | A1* | 7/2021 | Hong | H04W 74/0825 |
| 2022/0149922 | A1* | 5/2022 | Wang | H04W 76/19 |
| 2022/0200768 | A1* | 6/2022 | Go | H04L 5/0082 |
| 2022/0329295 | A1 | 10/2022 | Park et al. | |

(Continued)

FOREIGN PATENT DOCUMENTS

| | | |
|---|---|---|
| WO | 2020/194248 | 10/2020 |
| WO | 2021/015569 | 1/2021 |

OTHER PUBLICATIONS

ASUSTeK "Remaining Issues for Beam Failure Recovery Procedure" 3GPP TSG RAN WG1 Meeting AH 1801 R1-1800622, Vancouver, Canada, Jan. 22-26, 2018, 4 pages.

(Continued)

*Primary Examiner* — Fahmida S Chowdhury

(74) *Attorney, Agent, or Firm* — Perkins Coie LLP

(57) ABSTRACT

Methods and systems for techniques for beam management in wireless networks are disclosed. In one example aspect, the method includes receiving, by a wireless device, a configuration from a network device, and initiating, by the wireless device, a process to recover a link to a network based on information elements within the configuration associated with different criteria.

13 Claims, 13 Drawing Sheets

(56)    References Cited

U.S. PATENT DOCUMENTS

| | | | |
|---|---|---|---|
| 2023/0247673 A1 * | 8/2023 | Xu ..................... | H04B 7/18563 |
| | | | 370/329 |
| 2023/0284197 A1 * | 9/2023 | Zhang ............... | H04B 7/06964 |
| | | | 370/225 |
| 2024/0090064 A1 * | 3/2024 | Zhang ................ | H04B 7/0695 |

OTHER PUBLICATIONS

International Search Report and Written Opinion for PCT/CN2021/084855, filed Apr. 1, 2021, Report dated Jan. 6, 2022, 12 pages.

Partial European Search Report and Written Opinion for 21933941.3, Report dated Apr. 25, 2024, 33 pages.

NTT Docomo, Inc. "Discussion on multi-beam operation" 3GPP TSG RAN WG1 #104-e, e-Meeting, Jan. 25-Feb. 5, 2021, R1-2101597, 20 pages.

NTT Docomo, Inc. "Discussion on multi-beam enhancement" 3GPP TSG RAN WG1 #98bis, Chongqing, China, Oct. 14-20, 2019, R1-1911185, 20 pages.

Extended European Search Report and Written Opinion for 21933941.3, Report dated Jul. 16, 2024, 30 pages.

* cited by examiner

Illustration on the application time line for multiple configured candidates, e.g., two groups by MAC CE

1100

Receive, by a wireless device, a configuration from a network device — 1110

Initiate, by the wireless device, a process to recover a link to a network based on information elements within the configuration associated with different criteria — 1120

Figure 12:
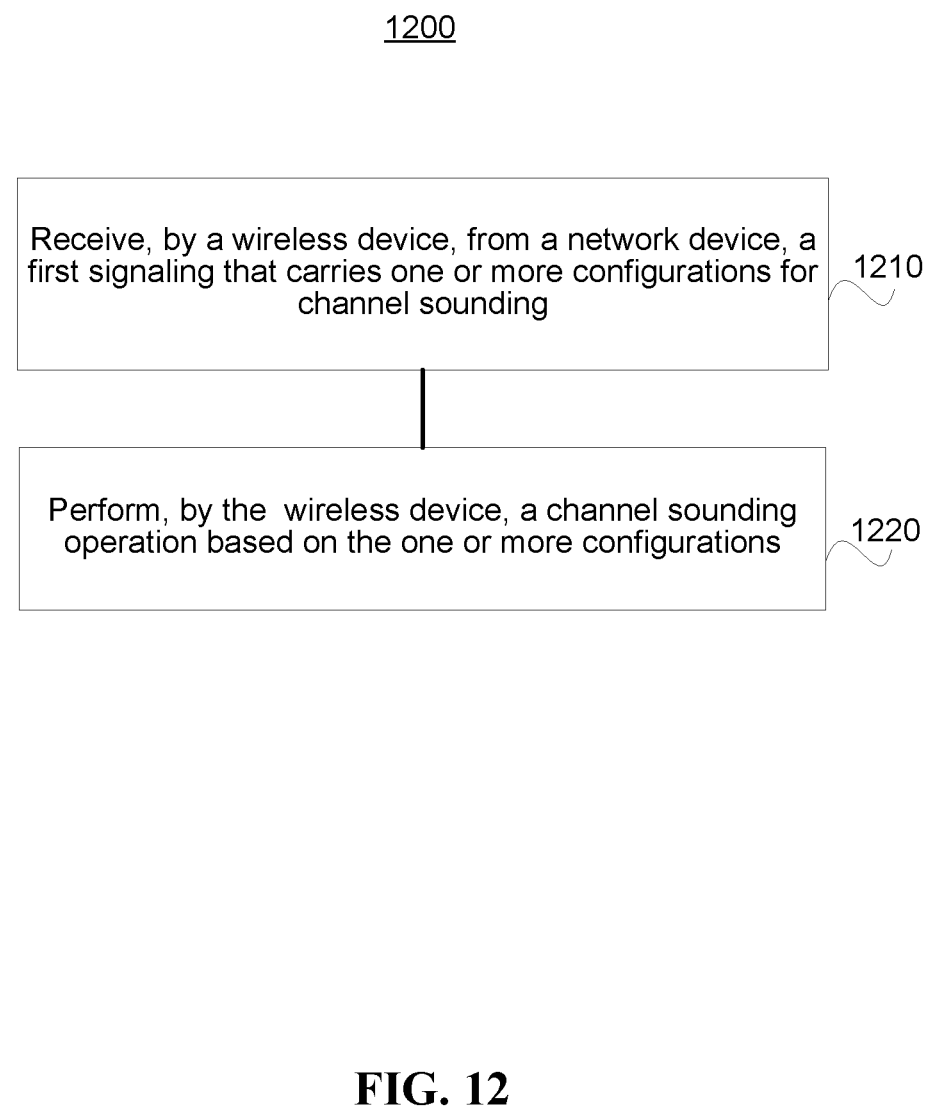

1200

Receive, by a wireless device, from a network device, a first signaling that carries one or more configurations for channel sounding    1210

Perform, by the wireless device, a channel sounding operation based on the one or more configurations    1220

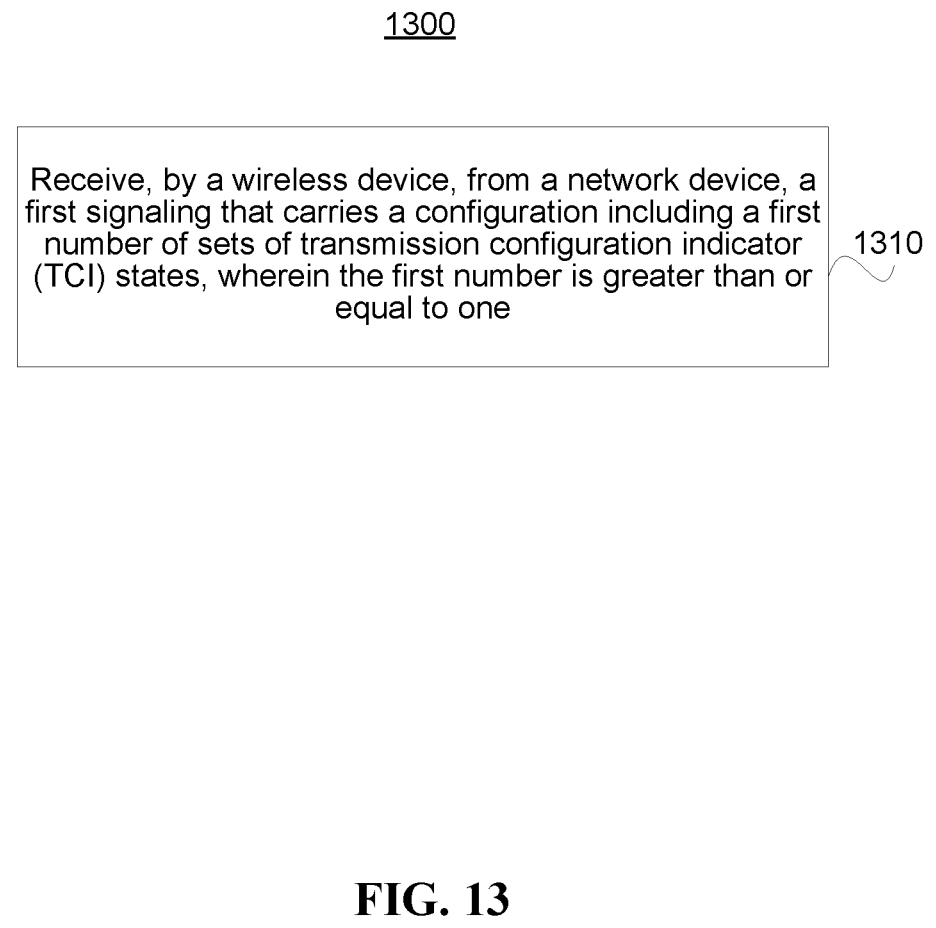

Receive, by a wireless device, from a network device, a first signaling that carries a configuration including a first number of sets of transmission configuration indicator (TCI) states, wherein the first number is greater than or equal to one      1310

FIG. 13

METHODS AND SYSTEMS FOR BEAM MANAGEMENT IN WIRELESS NETWORKS

CROSS-REFERENCE TO RELATED APPLICATION

This application is a continuation and claims priority to International Application No. PCT/2021/084855, filed on Apr. 1, 2021, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for beam management in wireless networks.

In one aspect, a method of data communication is disclosed. The method includes receiving, by a wireless device, a configuration from a network device, and initiating, by the wireless device, a process to recover a link to a network based on information elements within the configuration associated with different criteria.

In another aspect, a method of data communication is disclosed. The method includes receiving, by a wireless device, from a network device, a first signaling that carries one or more configurations for channel sounding, and performing by the wireless device a channel sounding operation based on the one or more configurations.

In another aspect, a method of data communication is disclosed. The method includes receiving, by a wireless device, from a network device, a first signaling that carries a configuration including a first number of sets of transmission configuration indicator (TCI) states, wherein the first number is greater than or equal to one.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWING

FIG. 12 shows another example of a process for wireless communication based on some example embodiments of the disclosed technology.

FIG. 13 shows another example of a process for wireless communication based on some example embodiments of the disclosed technology.

DETAILED DESCRIPTION

Section headings are used in the present document only for ease of understanding and do not limit scope of the embodiments to the section in which they are described. Furthermore, while embodiments are described with reference to 5G examples, the disclosed techniques may be applied to wireless systems that use protocols other than 5G or 3GPP protocols.

In the current system design, a lot of behaviors are dominated/controlled by a network device such as a base station (BS) to conduct the corresponding scheduling/measurement. However, comparing to the legacy application scenarios, e.g., urban/dense urban, in the emerging scenario, e.g., high speed train (HST), v2x, drone, satellite, ATG, the channel condition is more challenging due to the high mobility, rendering the legacy solutions inefficient to handle the issues.

For example, in the case of communication with v2x/ATG/drone, the user equipment (UE) can support multiple beams at either a lower or higher frequency. Upon movement of a terminal, Rx beam at the terminal side should be optimized timely to ensure the link quality and avoid undesirable interference. In such a situation, the legacy mode requires an extensive transmission of measurement signaling with a larger overhead, e.g., always-on periodical signaling.

In another example implementation, a single threshold for some mechanisms such as a beam failure recovery is configured along with certain RSs, only targeting the terminal at ground. However, for aerial communications, different channel conditions/serve beams are expected during the serve cycle with a dynamic movement. In this case, given its longer latency and signaling overhead, frequency updates on a certain configuration should be optimized.

In another example implementation, the scheduling information is based on some closed loop information exchanges between a terminal and BS with a certain latency, leading to a performance degradation and unnecessary signaling/measurement cost. However, in the scenario with a certain level of predictability and intelligent automation, e.g., HST, Drone/ATG or satellite, the scheduling information can be delivered in advance to ensure a constant QoS and reduce a potential measurement/tracking cost at the terminal side.

Figure 1:
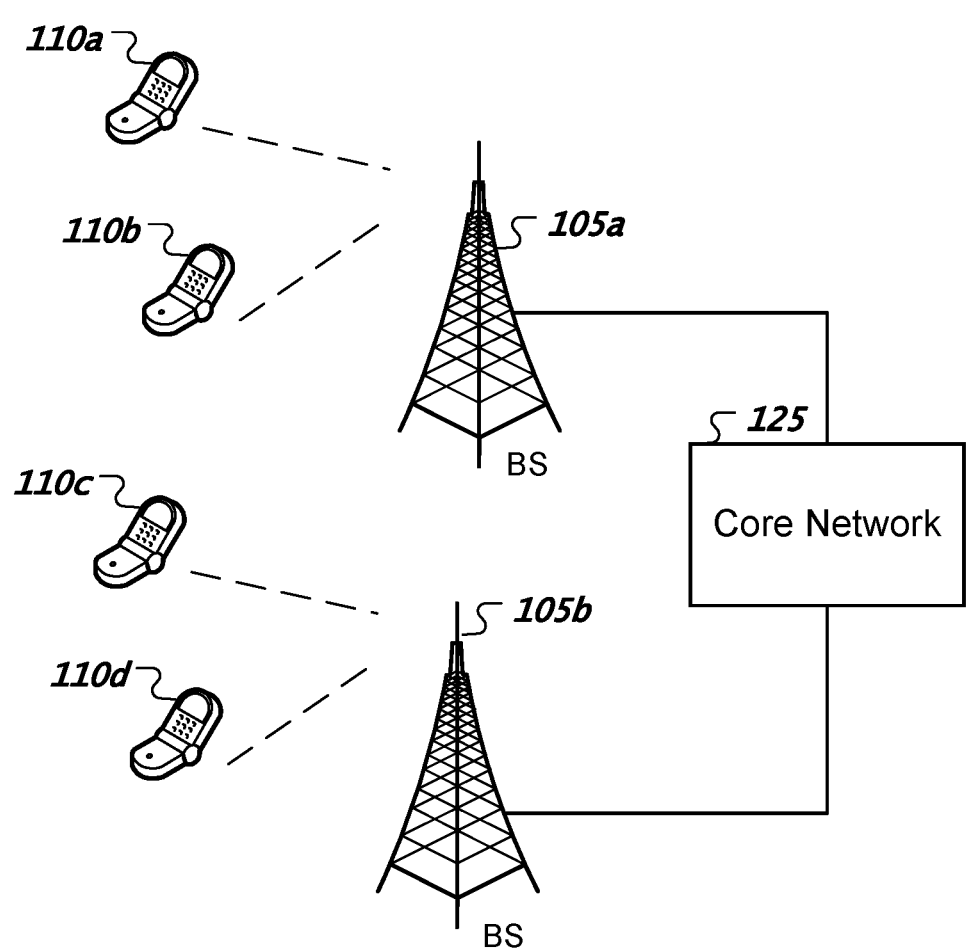
FIG. 1 shows a wireless communication system based on some example embodiments of the disclosed technology.

FIG. 1 shows an example of a wireless communication system 100 where techniques in accordance with one or more embodiments of the present technology can be applied. A wireless communication system 100 can include one or more base stations (BSs) 105*a*, 105*b*, one or more wireless devices 110*a*, 110*b*, 110*c*, 110*d*, and a core network 125. A base station 105*a*, 105*b* can provide wireless service to wireless devices 110*a*, 110*b*, 110*c* and 110*d* in one or more wireless sectors. In some implementations, a base station 105*a*, 105*b* includes directional antennas to produce two or more directional beams to provide wireless coverage in different sectors.

The core network 125 can communicate with one or more base stations 105*a*, 105*b*. The core network 125 provides connectivity with other wireless communication systems and wired communication systems. The core network may include one or more service subscription databases to store information related to the subscribed wireless devices 110*a*, 110*b*, 110*c*, and 110*d*. A first base station 105*a* can provide wireless service based on a first radio access technology, whereas a second base station 105*b* can provide wireless service based on a second radio access technology. The base stations 105*a* and 105*b* may be co-located or may be separately installed in the field according to the deployment scenario. The wireless devices 110*a*, 110*b*, 110*c*, and 1210*d* can support multiple different radio access technologies. The techniques and embodiments described in the present document may be implemented by the base stations of wireless devices described in the present document.

Figure 2:
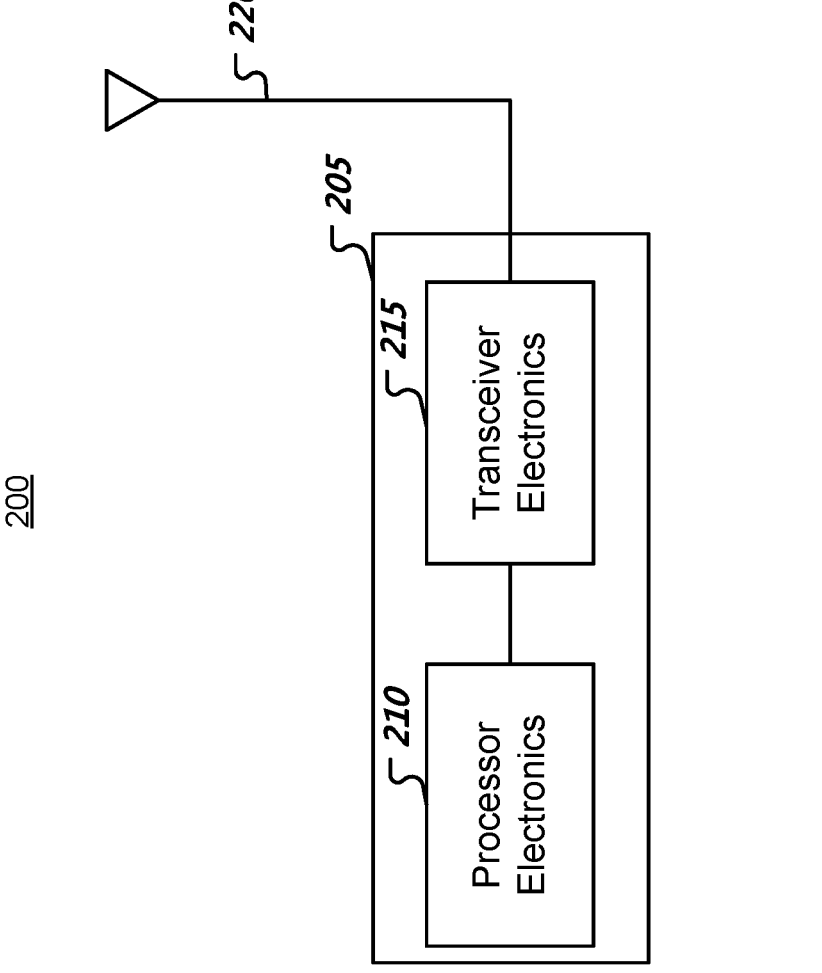
FIG. 2 shows a block diagram of a portion of a radio system based on some example embodiments of the disclosed technology.

FIG. 2 is a block diagram representation of a portion of a radio station in accordance with one or more embodiments of the present technology can be applied. A radio 205 such as a base station or a wireless device (or UE) can include processor electronics 210 such as a microprocessor that implements one or more of the wireless techniques presented in this document. The radio 205 can include transceiver electronics 215 to send and/or receive wireless signals over one or more communication interfaces such as antenna 220. The radio 205 can include other communication interfaces for transmitting and receiving data. Radio 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the radio 205. In some embodiments, the radio 205 may be configured to perform the methods described in this document. The network node described in the present application may be implemented using the above-described radio station or by using a hardware platform that includes a combination of one or more processors, one or more network interface hardware and one or more memories for storing processor-executable code or data.

Example Embodiment 1

The disclosed technology can be implemented based on some embodiments to improve legacy link recovery procedures.

In an example implementation for a link recovery procedure, failureDetectionResources (Optional IE) and candidateBeamRSList are configured to UE to detect whether the link quality is failed or new link is identified based on the corresponding RSRP or L1-RSRP threshold as Qout, L R and Qin, LR, respectively. Moreover, after identification of new beam for link recovery, the UE will initialize the PRACH procedure with the PRACH resource out of PRACH-ResourceDedicatedBFR according to the association between PRACH resource and RS index in candidateBeamRSList.

The disclosed technology can be implemented in some embodiments to provide the following enhancements.

RS (Reference Signal) List (e.g., candidateBeamRSList)

In some implementations, for each RS list, multiple sets (S>1) of RS are included in each information element (IE), and the usage of each RS is associated with corresponding criteria.

In one example where the candidateBeamRSList includes {RS-set1, RS-set2}, each set is defined as below:

RS-set1 SEQUENCE (SIZE (1 . . . maxNrofCandidate-Beams)) OF PRACH-ResourceDedicatedBFR OPTIONAL.

In some implementations, each RS list corresponds to a set of RS and for each purpose (e.g., failure detection or candidate beam identification), one or more new reference signal list(s) are configured. The usage of each RS list is associated with corresponding criteria.

In some implementations, for each purpose, only one IE (i.e., RS) list is used with a refined condition on the mapping of content to corresponding criteria.

In one example, for the candidateBeamRSList, a number of candidate RSs (up to X) are included in this IE.

candidateBeamRSList SEQUENCE (SIZE (1 . . . X)) OF PRACH-ResourceDedicatedBFR

Among X candidates, if three cases are defined by corresponding criteria, the X candidates can also be divided into three parts that are associated with each case. The number of RS in each part can be same (if same, by default without additional indication) or different (if different, detailed value should be indicated).

In some implementations, the terminal performs a measurement operation based on a plurality of resource, such as failureDetectionResources. The UE will access the channel condition by comparing the measured results to a threshold. If the measured value does not reach the threshold, the UE will send an indication to a higher layer.

RSRP or L1-RSRP Threshold as Qout, LR or Qin, LR

In some implementations, for each threshold, multiple values are indicated within a list or separately via different IEs, and each value can be at least one of the following: absolute value; only the first value is absolute value and others are relative value comparing to the first value; only the first value is absolute value and others are relative value comparing to the previous one; and only one of value is absolutely value and others are defined as function of this value and criteria.

Criteria

In enabling the above configurations and matching the application scenarios, the following criteria can be considered.

In some implementations, a height can be considered as a parameter.

In one example, the height parameter can include an absolute height of a terminal or a wireless device such as UE (e.g., height from the ground level the sea level). In indicating the height, the definition of "0" may be different depending on the geographic area due to different altitudes.

In one example, the height parameter can include a height relative to a base station (BS). The indication of information associated with a BS can be based on at least one of the height of the terminal or the location of the BS.

In one example, the height parameter can be indicated on a granularity basis, which is indicated by a step-size and a reference point.

Figure 3:
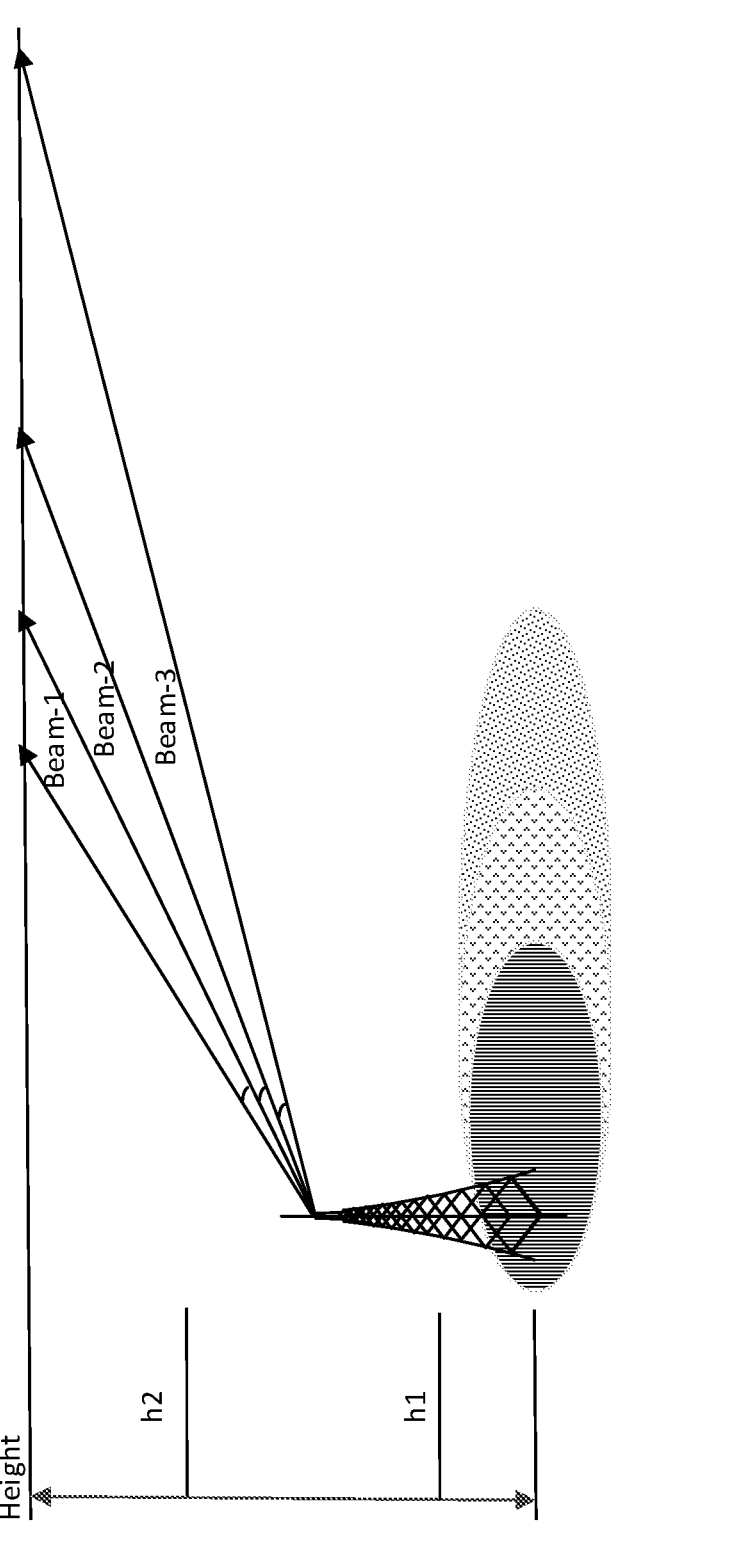
FIG. 3 shows an example where multiple criteria are configured to map configurations to different cases.

FIG. 3 shows an example where multiple criteria are configured to map configurations to different cases.

As shown in FIG. 3, multiple criteria, e.g., h1 and h2, can be configured, and then the configuration is mapped to three cases including: below h1; between h1 and h2; and above h2.

If no criteria are configured, the same parameters may be used for all cases.

In some implementations, an elevation can be considered as a parameter. The elevation parameter may include the elevation angle of the links UE-BS.

In some implementations, a distance between the BS and the UE can be considered as a parameter. For example, the distance can include a horizontal distance.

In one example, the information associated with the BS (e.g., location) can be required as an additional indication for the UE to consider the elevation and the distance.

In some implementations, a location of UE can be considered as a parameter. In this way, the service region of each BS can be divided into different zones (e.g., geographic region), and, for a UE within each region, the configuration will be different. The division of region/zone can also be done one a height basis or a region basis, and in this way, the location of UE and the height can be jointly indicated.

In some implementations, information associated with UE can be considered as a parameter. Here, multiple configurations can be based on the UE information such as UE type or UE status.

In one example, for a drone (aerial UE, identified with a corresponding identifier), multiple sets of configurations may be enabled. For other UEs, one single set may be assumed.

In one example, for a drone, a different configuration may be associated with the UE status, such as parking, rising, in-fly or hovering.

For example, different Q in or Q out quality can be configured for the drone in a hovering or in-fly mode to achieve a different sensitivity beam optimization.

In some implementations, a time-based parameter such as a serving window or an offset can be considered as a parameter.

In some implementations, a determination of a set of candidate reference signals is based on a pre-defined rule. For example, among X candidate reference signals within a list, if three cases are defined by corresponding criteria, the X candidates can also be divided into three sets.

Example Embodiment 2

The disclosed technology can be implemented based on some embodiments to improve beam management (measurement/reporting) based on a downlink reference signal (DL RS).

In existing spec for beam management, the general procedure is that gNB configure the periodic/semi-persistent/Aperiodic resource for measurement as a set of RS along with the corresponding report is also triggered by BS.

In this case, each RS or RS resource set is associated with a corresponding TCI state, which implies the corresponding beam information. In this case, to cover all potential beams, multiple resource/resource sets should be configured with a large signaling overhead. If RS is transmitted with a higher density in a time domain, it will lead to a large overhead, especially for a periodic case. The BS dominated triggering mechanism may not be aligned with the channel variations and changes in channel conditions of UE beams for DL reception or UL transmission.

The determination of UL beams is based on the so-called beam correspondence. It means that the proper beam for UL transmission is aligned the beam for DL reception.
Configuration for Measurement The disclosed technology can be implemented in some embodiments to optimize the RS list. This optimization scheme is applicable for both the UE triggered mechanism and the enhancement to legacy BS dominated mechanism.

In some implementations, for each configuration (e.g., CSI-aperiodicTriggerState), multiple sets (S>1) of RS for each type (e.g., resourcesForChannel) are included, and the usage of each set is associated with corresponding criteria.

Figure 4:
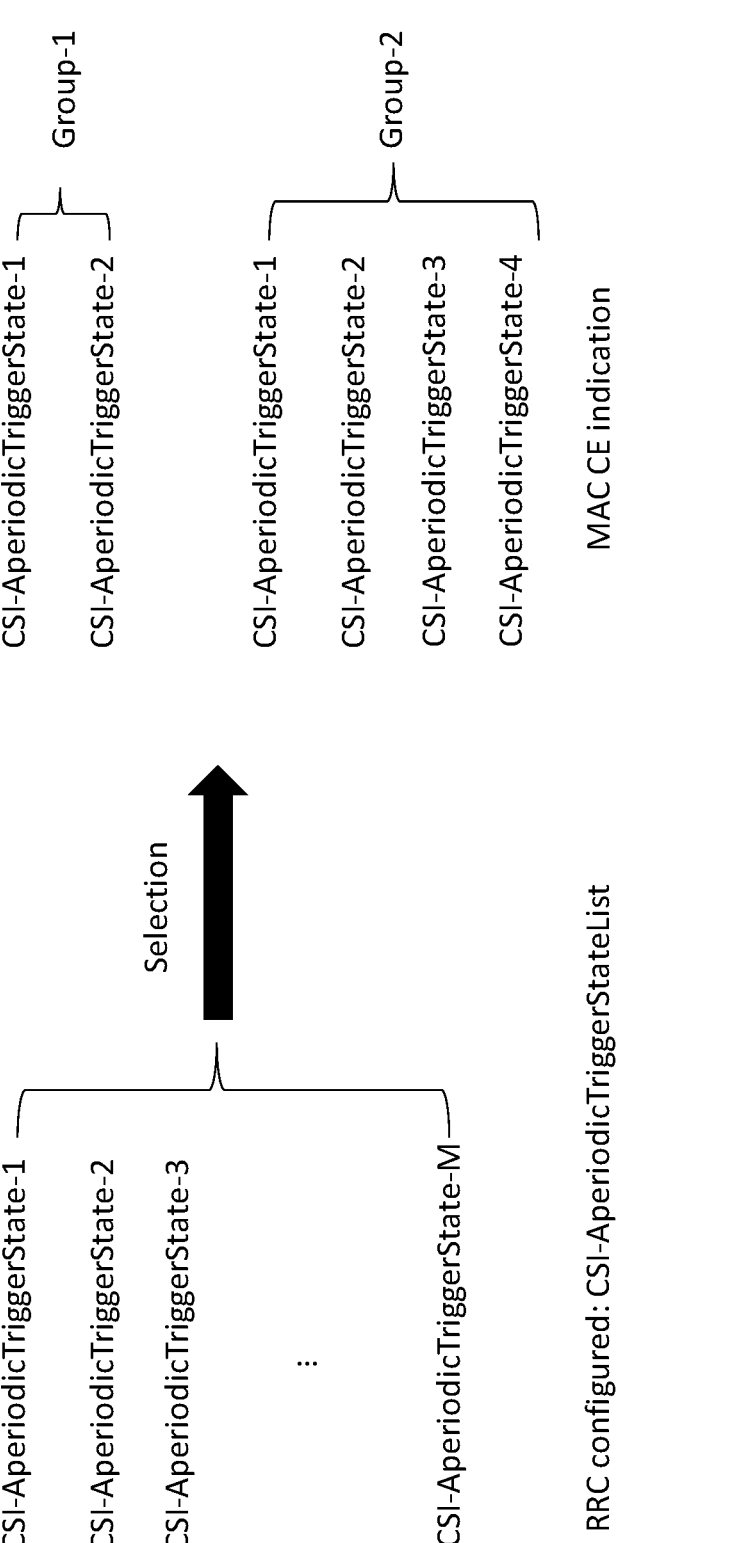
FIG. 4 shows an example where configurations within a list are selected into different groups associated with corresponding criteria.

FIG. 4 shows an example where configurations within a list are selected into different groups associated with corresponding criteria.

In some implementations, for one configuration list (e.g., CSI-AperiodicTriggerStateList), configurations within this list are selected into different groups associated with corresponding criteria. The indication on the grouping part may be done by MAC CE command.

Furthermore, each group may include a number of items up to N, where N is determined by: (1) N is configured by a base station. The required bit field (N_bit) to carry the preferred item in the triggering information sent by UE is also determined by N as N_bit=ceil(log 2(N)); or (2) the maximum value is predetermined.

In some implementations, for more than one configuration list, the usage of each list is associated with corresponding criteria.
Optimization on the TCI Configuration The disclosed technology can be implemented to improve the UE side beam training. It is assumed that RSs within the same set has the same TCI.

In some implementations, for the RS or RS set included in a radio resource control (RRC) configuration (e.g., CSI-AperiodicTriggerStateList, or NZP-CSI-RS-Resource/NZP-CSI-RS-ResourceSet) for UE side beam management (i.e., repetition=on), no TCI information is configured, and with respect to these RSs (e.g., with RS set) for measurement, it is assumed that quasi co location (QCL) information is the same as the latest indicated TCI for Physical Downlink Shared Channel (PDSCH) (e.g., via DCI)/Physical Downlink Control Channel (PDCCH) transmission.

In some implementations, with respect to these RSs (e.g., with RS set) for measurement, it is assumed that the QCL information is the recommend QCL information for UE side training as will be discussed below.

Figure 5:
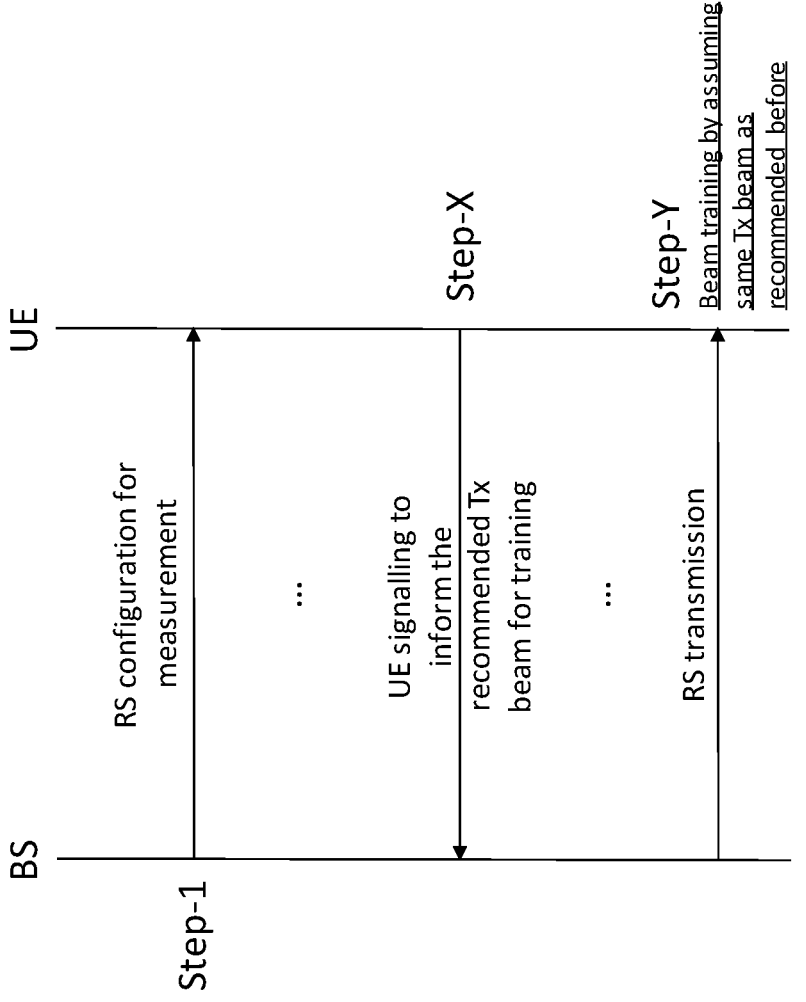
FIG. 5 shows an example of a signaling exchange between a network device (e.g., BS) and a wireless device (e.g., US) following a transmission of reference signals for measurement.

FIG. 5 shows an example of a signaling exchange between a network device (e.g., BS) and a wireless device (e.g., US) following a transmission of reference signals for measurement.

In one example, at Step-1, the configuration of RS for measurement is set to UE, in which, for the RS used for UE side beam management, the TCI configuration is not configured At Step-X, UE sends the corresponding information for the recommended Tx beam for UE side training (e.g., such information can be part of triggering signaling defined in the section for trigger mechanism). In one example, the information related to the recommended Tx beam can include at least one of TCI index or RS index.

At Step-Y, UE will conduct the corresponding beam training, assuming the recommended QCL relationship.

Trigger Mechanism

The trigger mechanism disclosed in this patent document includes a UE triggered solution. The trigger mechanism can include different aspects as will be discussed below.

(a) Trigger condition: In general, whether to trigger the corresponding behavior at UE side is based on UE implementations. If the network wants to provide some restrictions on this function, however, enabling/disabling of functionality is indicated by BS.

(b) Only triggering for measurement report/triggering for RS transmission or joint triggering.

(c) Examples of the signaling for triggering from UE side may include: a scheduling request (SR); a buffer status report (BSR); a dedicated physical random access channel (PRACH) resource (e.g., preamble for Msg-1/ or msg-A with content for 2-step RACH); a power headroom report (PHR) report; and a newly defined procedure (e.g., MAC LEVEL).

Upon receipt of signaling/report for triggering from UE side, the gNB may send the RS or a scheduling resource to carry the report. Upon receipt of signaling/report for triggering from UE side, the gNB may initialize the measurement/report procedure.

Figure 6:
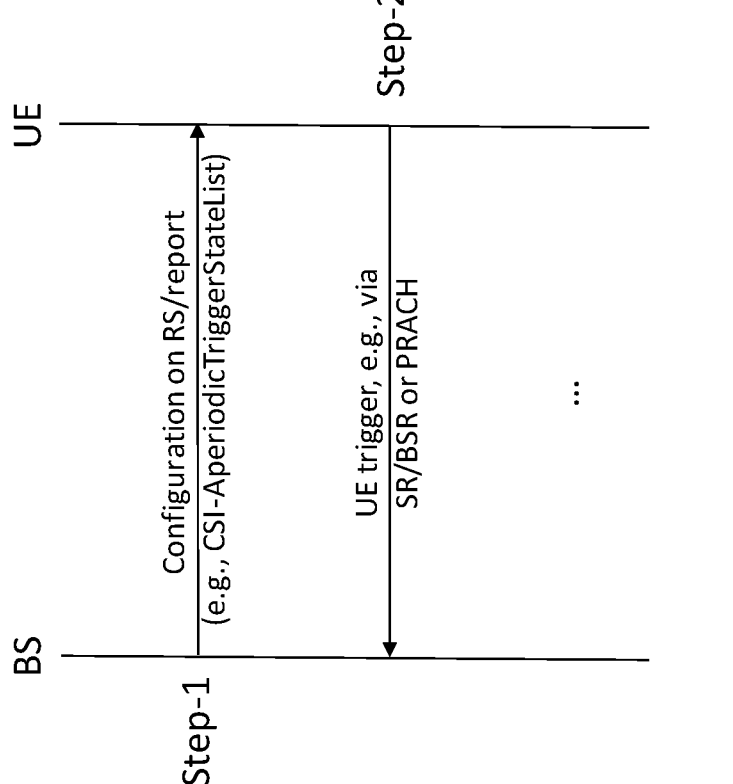
FIG. 6 shows an example of a process for initializing a beam management operation by a wireless device.

FIG. 6 shows an example of a process for initializing a beam management operation by a wireless device.

In some implementations, at Step-1, X configuration list (e.g., CSI-AperiodicTriggerStateList) is configured at UE with the following options.

In one example, X=1, in each list, a part of CSI-aperiodicTriggerState is applied upon satisfaction of the criteria.

In one example, X>=2 lists are configured, each of the list is applied upon satisfaction of the criteria.

Here, if multiple groups of configurations (e.g., CSI-aperiodicTriggerState) are indicated, only one group will be mapped to the indication field in DCI once the criteria is satisfied. If only one group of configurations is indicated, and, for each configuration, if multiple sets of reference signals are configured, only one set of RSs that belong to one configuration will be applied once the criteria is satisfied if this configuration is selected by the DCI signaling.

In a case where trigger states are selected via MAC CE at gNB side, multiple subsets can be formed by MAC CE procedure as will be discussed below.

At Step-2, UE will initialize the beam management related procedure via sending signaling, more specifically In some implementations, if one list is configured, L sets are constructed by selecting TCIs within this list by MAC CE, e.g., by MAC CE. If more than one list is configured, the L sets can be constructed per list, e.g., by MAC CE. In one example, the TCI within each set is used individually. If more than one list is configured, the L sets are constructed per list, e.g., by MAC CE. TCI within each set is used individually.

Referring to FIG. 6, in the Content for UE Triggering Stage

If only one configuration (e.g., one CSI-AperiodicTriggerState) is configured or available for UE side beam training (e.g., corresponding to repetition=on) or Tx side beam training (e.g., corresponding to repetition=off), the UE may only need to send the trigger information If more than one configuration (e.g., one CSI-AperiodicTriggerState) is configured or available for the UE side beam training (e.g., corresponding to repetition=on) or Tx side beam training (e.g., corresponding to repetition=off), the UE may also indicate the preferred configuration (e.g., index) to BS. Here, the configuration may correspond to either more than one list or more than one configuration per list.

Figure 7:
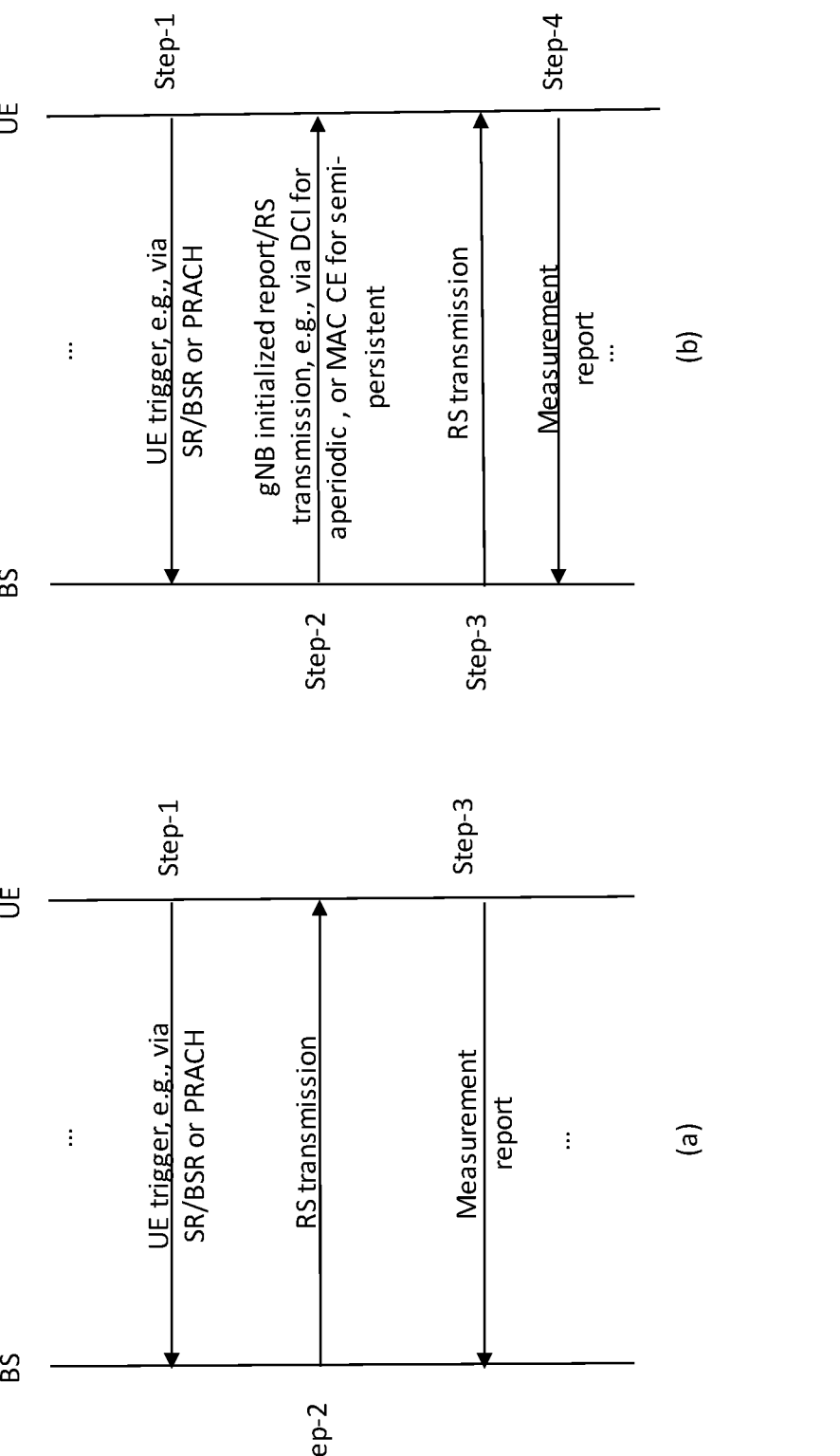
FIG. 7 shows examples of signaling exchanges following a triggering mechanism by a wireless device.

FIG. 7 shows examples of signaling exchanges following a triggering mechanism by a wireless device.

In some implementations, the operations following the triggering from UE side are illustrated in FIGS. 7 (a) and (b).

At Step-1, UE sends the trigger information to BS. After sending the trigger information from UE to BS, the following options may be considered.

In some implementations, as shown in FIG. 7(a), BS will directly send the corresponding RS based on the trigger information from the UE side. At Step-3, UE reports the corresponding feedback (e.g., measurement report).

In some implementations, as shown in FIG. 7(a), Step 2 may not be needed in some cases, for example, if a reference signal for measurement is periodic or semi-persistent, these signals will be sent once the RS configuration is done or enabled by MAC CE. Then, the trigger information that is sent from UE at Step-1 is only used to trigger the corresponding measurement report.

After sending the trigger information, UE will send the corresponding report, e.g., with X time offset after the sending of triggering information. The BS will directly send the corresponding RS based on the trigger information from the UE side. At Step-3, UE reports the corresponding feedback (e.g., measurement report).

In some implementations, as shown in the FIG. 7(a), Step 3 may not be needed in some cases. For example, if the triggered behavior is for UE side beam training, upon receipt of these RSs, the UE may not need to report the measurement results.

In some implementations, as shown in FIG. 7(b), upon receipt of the trigger information from the UE side at Step-1, gNB will initialize the measurement procedure as will be discussed below.

If the preferred index is included the triggering information from UE, at Step-2, it is assumed that the same index is indicated in the signaling from BS.

The signaling can be downlink control information (DCI), and the triggered index of configuration can be indicated by a bit-field in the DCI e.g., channel state information (CSI) request.

The UE may expect to receive the signaling from BS to initialize the measurement/report with Y time offset after sending the trigger information.

Example Embodiment 3

Similar to DL RS based solutions, for the UL RS (SRS) based solutions may also follow the procedure by which gNB may configure the periodic/semi-persistent/Aperiodic resource for RS transmission. For the aperiodic RS, the transmission is triggered by the DCI from BS.

Trigger Mechanism

In some implementations, the trigger mechanism may include different aspects. With respect to the trigger condition/signaling, Example embodiment 3 is identical or similar to Example embodiment 2 discussed above.

Figure 8:
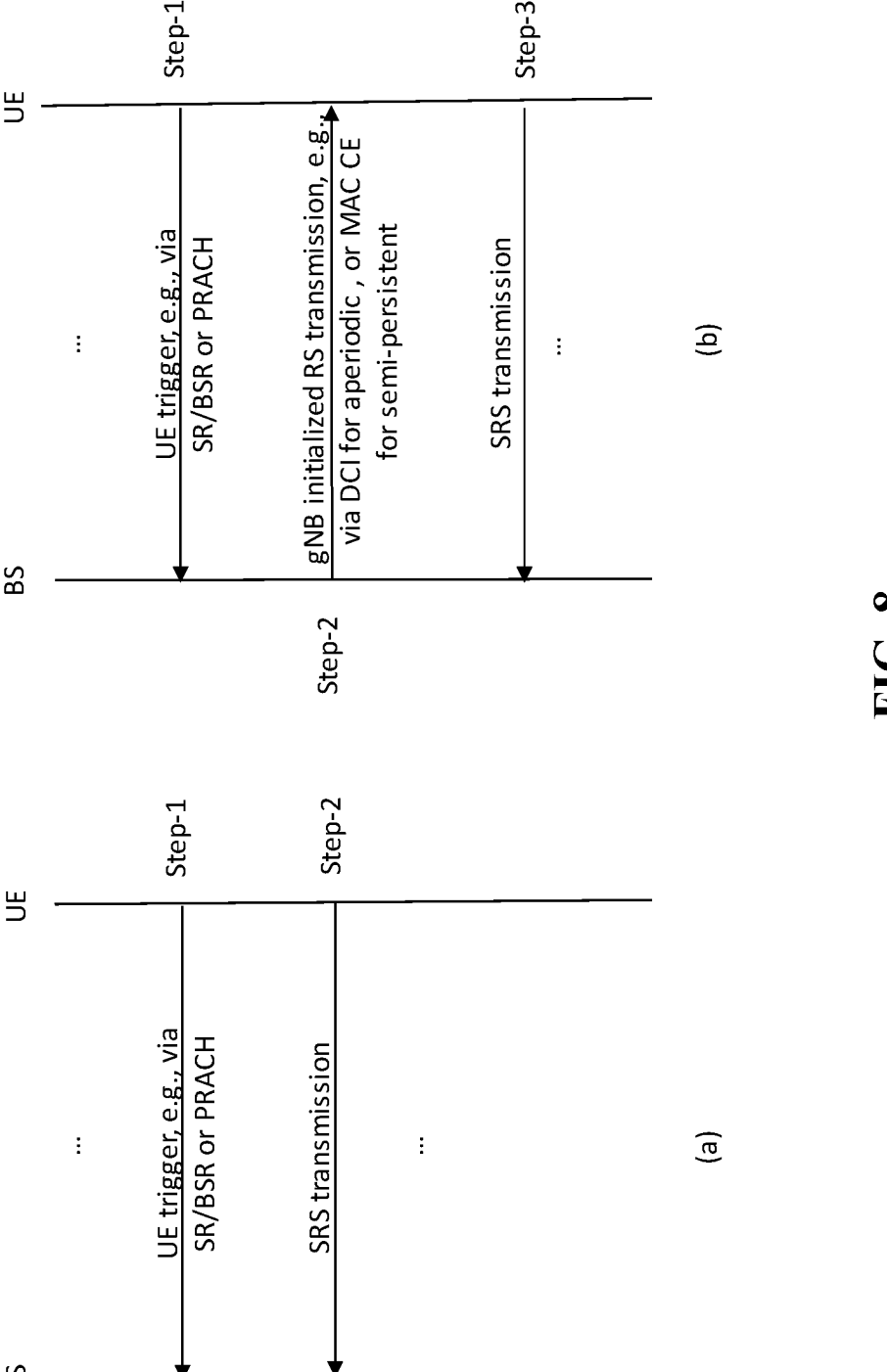
FIG. 8 shows examples operations between a network device (e.g., BS) and a wireless device (e.g., US) following a triggering mechanism by the wireless device.

FIG. 8 shows examples operations between a network device (e.g., BS) and a wireless device (e.g., US) following a triggering mechanism by the wireless device.

In some implementations, at Step-1, the UE will send the trigger information to BS. After sending the trigger information from UE, the following options can be considered.

In one example, as shown in FIG. 8(*a*), UE may further send the SRS with X time offset after the sending of the triggering information.

In another example, as shown in FIG. 8(*b*), upon receipt of UE triggering information from UE, gNB will initialize the RS transmission via DL signaling. If the preferred index is included the triggering information from UE, at Step-2, it is assumed that the same index is indicated in the signaling from BS. The UE may expect to receive the signaling from BS to initialize the measurement/report with Y time offset after sending the trigger information.

The signaling can be DCI, and the triggered index of configuration can be indicated by a bit-field in DCI, e.g., SRS request.

In some implementations, the "beam" indication may include the QCL information indication, which may be denoted as TCI information for DL.

Example Embodiment 4

With respect to the beam indication, a list of TCI states can be defined as will be discussed below.

tci-StatesToAddModList: a list of Transmission Configuration Indicator (TCI) states indicating a transmission configuration which includes QCL-relationships between the DL RSs in one RS set and the PDSCH DMRS ports. A part of them can be taken as an independent list for PDCCH.

tci-StatesPDCCH-ToAddList: a subset of the TCI states defined in pdsch-Config included in the BWP-DownlinkDedicated corresponding to the serving cell and the DL BWP to which the ControlResourceSet belongs. They are used for providing QCL relationships between the DL RS(s) in one RS Set (TCI-State) and the PDCCH DMRS ports. The network configures at most maxNrofTCI-StatesPDCCH entries.

Then, based on the above two lists, the detailed indications for each channel are conducted as follows.

(a) PDCCH: for each DCI, the UE will follow the corresponding TCI selected by the MAC (indicated via MAC CE) among the RRC (if more than one TCI state is included in the list).

(b) PDSCH: the corresponding beam indication is done in the following two ways.

(1) If the higher layer parameter tci-PresentInDCI is set as "enabled" for the CORESET scheduling the PDSCH, the UE assumes that the TCI field is present in the DCI format of the PDCCH transmitted on the CORESET. The corresponding update on the beam is also performed based on the reception of DCI indication. The indicated TCI state via DCI is determined by the following operations.

If the configured TCI state in one list exceeds the threshold (e.g., 8, determined by corresponding bit-field length), the selection/combination will be done by the MAC CE action. Then, the corresponding indication via DCI will be mapped to the selected subset by MAC CE. If the configured TCI state in one list does not exceed the threshold, the DCI will be mapped to the TCI status configured in the list by a radio resource control (RRC).

(2) If the higher layer parameter tci-PresentInDCI is set as "disabled," the UE will assume the same TCI as the PDCCH is applied for the PDSCH.

Configuration of TCI Status

In some implementations, more than one list of TCI state can be configured (e.g., tci-StatesToAddModList). The usage of each RS is associated with corresponding criteria.

Figure 9:
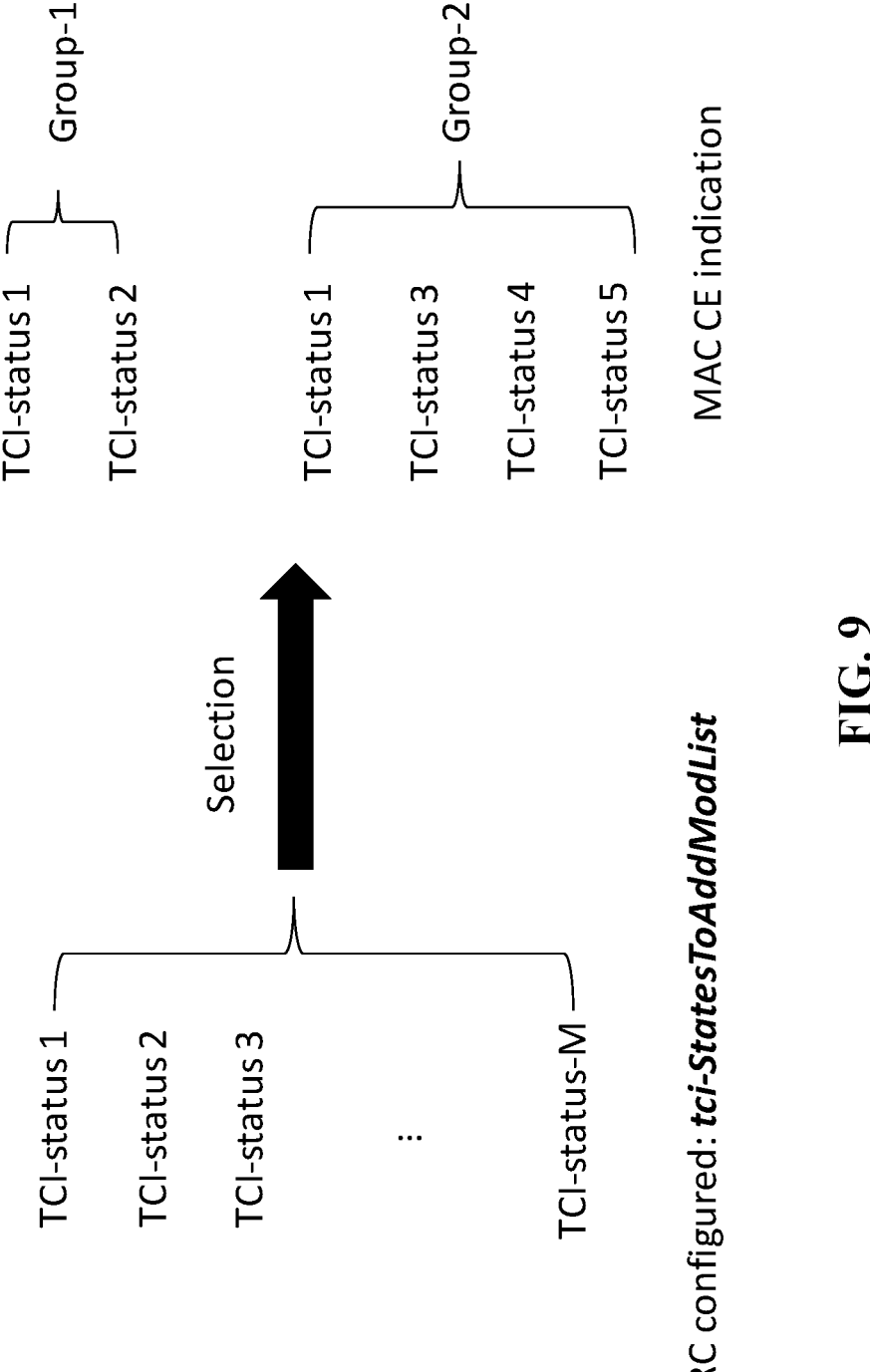
FIG. 9 shows an example of selecting more than one TCI status group each of which is associated with corresponding criteria where a list of TCI states is configured.

FIG. 9 shows an example of selecting more than one TCI status group each of which is associated with corresponding criteria where a list of TCI states is configured.

In some implementations, in a case where one list of TCI states is configured, more than one group is selected by the MAC CE as shown in FIG. 9, and each group is associated with corresponding criteria.

Criteria

In enabling the above configurations and matching the application scenarios, the following criteria can be considered.

In some implementations, a height of a terminal or a wireless device (e.g., UE) can be considered as a parameter.

In some implementations, an elevation can be considered as a parameter. The elevation parameter may include the elevation angle of the links UE-BS.

In some implementations, a distance between the BS and the UE can be considered as a parameter. For example, the distance can include a horizontal distance.

In some implementations, a location of UE can be considered as a parameter.

In some implementations, information associated with UE can be considered as a parameter.

In some implementations, a time-based parameter such as a serving window or an offset can be considered as a parameter.

Figure 10:
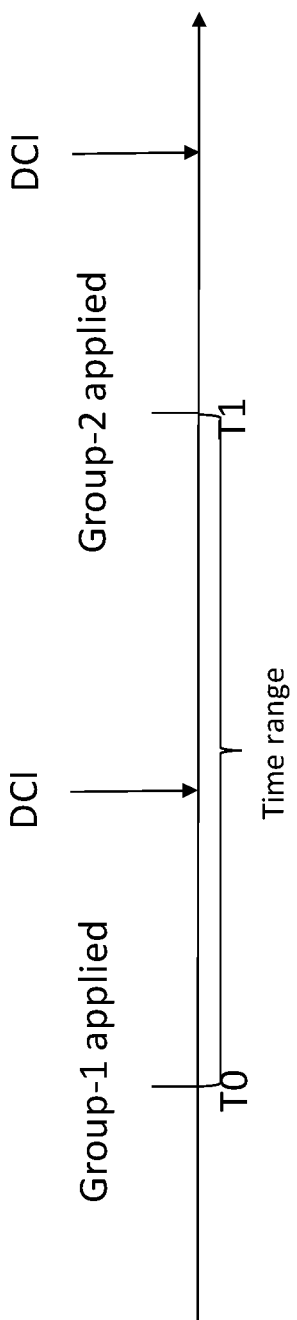
FIG. 10 shows an example timing diagram where multiple groups are selected.

FIG. 10 shows an example timing diagram where multiple groups are selected.

In some implementations, using a time-based solution as shown in FIG. 10, if multiple groups are selected by the MAC with an indication via MAC CE, it can be assumed that the group is applied by following the sequence of group index, and additional time information, e.g., application duration for each group, or time offset is defined.

For each DCI indication, the value presented by the bit field in the corresponding DCI, e.g., transmission configuration indication, will be associated with the corresponding TCI state contained in the group that is applied.

Figure 11:
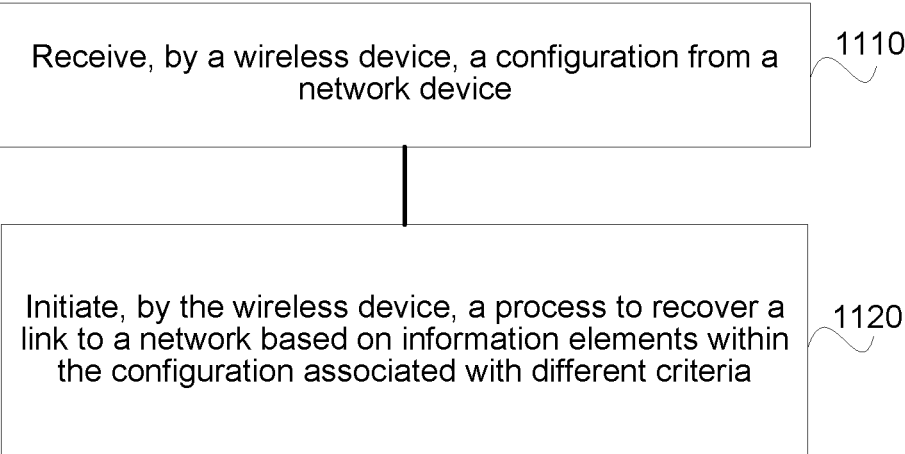
FIG. 11 shows an example of a process for wireless communication based on some example embodiments of the disclosed technology.

FIG. 11 shows an example of a process for wireless communication based on some example embodiments of the disclosed technology.

In some implementations, the process 1100 for wireless communication may include, at 1110, receiving, by a wireless device, a configuration from a network device, and at 1120, initiating, by the wireless device, a process to recover a link to a network based on information elements within the configuration associated with different criteria.

FIG. 12 shows another example of a process for wireless communication based on some example embodiments of the disclosed technology.

In some implementations, the process 1200 for wireless communication may include, at 1210, receiving, by a wireless device, from a network device, a first signaling that carries one or more configurations for channel sounding, and at 1220, performing, by the wireless device, a channel sounding operation based on the one or more configurations.

FIG. 13 shows another example of a process for wireless communication based on some example embodiments of the disclosed technology.

In some implementations, the process 1300 for wireless communication may include, at 1310, receiving, by a wireless device, from a network device, a first signaling that carries a configuration including a first number of sets of transmission configuration indicator (TCI) states, wherein the first number is greater than or equal to one.

It will be appreciated that the present document discloses techniques that can be embodied in various embodiments to provide improved beam management schemes in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network device includes a base station including a next generation Node B (gNB), enhanced Node B (eNB), or any other device that performs as a base station. A resource range may refer to a range of time-frequency resources or blocks.

Clause 1. A method of wireless communication, comprising: receiving, by a wireless device, a configuration from a network device; and initiating, by the wireless device, a process to recover a link to a network based on information elements within the configuration associated with different criteria.

In some implementations, a transmission/reception of the configuration can be performed via RRC, SIB or MAC CE.

Clause 2. The method of clause 1, wherein the configuration includes a plurality sets of candidate reference signals.

Clause 3. The method of clause 2, wherein the plurality of sets of candidate reference signals is included in a reference signal list.

In some implementations, each set corresponds to a reference signal list. In some implementations, the sets of candidate reference signals may be determined based on a pre-defined rule. For example, among X candidate reference signals within a list, if three cases are defined by corresponding criteria, the X candidates can also be divided into three sets corresponding to the three cases.

In some implementations, in enabling/disabling this functionality, the multiple sets within one list or multiple list may be configured according to the UE identifier or UE capability reported, e.g., a specific UE identifier is allocated to a drone for identification.

In some implementations, in enabling/disabling this functionality, the functionality is enabled only when multiple configurations are enabled, e.g., multiple resource sets/lists or thresholds.

Clause 4. The method of clause 1, wherein the configuration includes a plurality sets of channel-accessing reference signals.

Clause 5. The method of clause 4, wherein the plurality of sets of channel-accessing reference signals is included in a reference signal list.

In some implementations, in enabling/disabling this functionality, the multiple sets within one list or multiple lists may be configured according to the UE identifier or UE capability reported, e.g., a specific UE identifier is allocated to the drone for identification.

In some implementations, in enabling/disabling this functionality, the functionality is enabled only when multiple configurations are enabled, e.g., multiple resource sets/lists or thresholds.

Clause 6. The method of clause 1, wherein the wireless device receives the configuration via at least one of a radio resource control (RRC), a system information block (SIB), or a medium access control (MAC) control element (MAC CE).

Clause 7. The method of any of clauses 1 to 6, wherein the configuration includes a first number of first parameters, and wherein the method further comprises accessing, by the wireless device, a channel condition based on at least one of the first parameters.

In some implementations, the accessing of the channel condition may include the following operations. The terminal may perform a measurement based on a plurality of resource (e.g., failureDetectionResources). The UE may access the channel condition by comparing the measured results to the threshold. If the measured value does not reach the threshold, the UE will send an indication to a higher layer.

In some implementations, the parameter is a threshold value, e.g., reference signal received power (RSRP) or signal-to-noise and interference ratio (SINR).

In some implementations, the threshold value may be defined as a function of other factors, e.g., a step-wise function of the changes in height, elevation, distance, etc.

In some implementations, the following can be based on multiple configurations: channel accessing reference signal sets for accessing the channel condition; candidate reference signal sets; first parameter for accessing the channel; second parameter for determining a new beam (e.g., a reference signal among candidate reference signal). Among these four aspects, in some cases, one of them may be configured with multiple sets. In other cases, all of them may be configured with multiple configurations.

In some implementations, if multiple configurations for 2/3/4 are configured, the channel accessing reference signal sets for accessing the channel condition may not be configured by the network device.

In some implementations, if a channel accessing reference signal is configured, the wireless device may access the channel by comparing the measured results based on the channel accessing reference signal to the first parameter. If the channel accessing reference signal is not configured, the wireless device may access the channel by comparing the measured results based on others to the first parameters.

Clause 8. The method of any of clauses 1 to 6, wherein the configuration includes a second number of second parameters, and wherein the method further comprises determining, by the wireless device, a reference signal among at least one of the sets of candidate reference signals based on at least one of the second parameters.

In some implementations, the following can be based on multiple configurations: channel accessing reference signal sets for accessing the channel condition; candidate reference signal sets; first parameter for accessing the channel; second parameter for determining a new beam (e.g., a reference signal among candidate reference signal). Among these four aspects, in some cases, one of them may be configured with multiple sets. In other cases, all of them may be configured with multiple configurations.

In some implementations, if multiple configurations for 2/3/4 are configured, the channel accessing reference signal sets for accessing the channel condition may not be configured by the network device.

In some implementations, if a channel accessing reference signal is configured, the wireless device may access the channel by comparing the measured results based on the channel accessing reference signal to the first parameter. If the channel accessing reference signal is not configured, the wireless device may access the channel by comparing the measured results based on others to the first parameters.

Clause 9. The method of any of clauses 7 to 8, wherein each of the parameter is an absolute value, or a first value of the parameter is an absolute value and the other values of the parameter are relative values that are compared to the first value or a previous value.

Clause 10. The method of any of clauses 7 to 8, wherein at least one of the parameters or at least one of the sets of candidate reference signals is selected upon satisfaction of associated criteria.

In some implementations, the satisfaction of associated criteria may be determined based on the following operations. The number of criteria can be the same as the number of configurations or can be less the number of configurations.

In some implementations, in defining N cases, N−1 criteria may be enough, especially when the numerical values are used as criteria.

In some implementations, two sets of reference signals (e.g., different sets in one list or in different lists) may be configured and only one criterion is also configured. Thus, the number of criteria may be different from the number of configurations. In this way, a first set of reference signal may be used once the actual situation does not exceed the situation defined by the criteria, and another one is for the actual situation that has reached the situation defined by the criteria. In one example, if a height of the wireless device is configured as the criteria, and if the actual UE height is below the height defined by the criteria, the UE may use the corresponding threshold or candidate resource set as in clauses 5 and 6. Otherwise, another threshold or candidate resource set may be used.

In some implementations, for the time offset-based solution, N−1 threshold can be used. For the time window-based solution, N windows may be configured for N cases with one to one mapping.

In some implementations, the associated criteria or the configuration of criteria can be determined based on the following operations. In one example, criteria may be configured in different signal as other configurations, and mapping is done in sequent or pre-defined rule. In another example, criteria may be configured together with the corresponding configuration. e.g., for the 1st parameter, the criteria may be configured as a combination of the first parameter and the criteria.

Clause 11. The method of clause 10, wherein the selected parameter or candidate reference signal is indicated by the network device via a medium access control (MAC) control element (MAC CE).

Clause 12. The method of any of clauses 1 to 11, wherein the criteria include at least one of: a height of the wireless device; an elevation angle of between the wireless device and the network device; a distance between the wireless device and the network device; a service region where the wireless device is in; a duration or window of time; and information associated with the wireless device.

In some implementations, the information may include a UE type, or a status such as parking, rising, in-fly or hovering.

In some implementations, the criteria may include a plurality of heights, a plurality of elevation angles, a plurality of distances, a plurality of service regions, a plurality of durations or time windows, a plurality of pieces of information associated with the wireless device.

In some implementations, the duration can be represented by a time-offset. For example, the first value is applied at slot N, but the second one will be used in N+T_offset.

Clause 13. The method of any of clauses 1 or 12, wherein the criteria are included in the configuration from the network device.

Clause 14. A method of wireless communication, comprising: receiving, by a wireless device, from a network device, a first signaling that carries one or more configurations for channel sounding; and performing by the wireless device a channel sounding operation based on the one or more configurations.

In some implementations, the first signaling may include at least one of RRC or MAC CE.

In some implementations, the beam management is also one type of the channel sounding (including procedures for measurement and reporting), e.g., measurement on a reference signal and/or reporting on the measured channel (e.g., RSRP).

In some implementations, the channel sounding operation may include a channel measurement and/or a CSI reporting.

Clause 15. The method of clause 14, wherein each of the one or more configurations includes a reference signal list including one or more sets of reference signals for a channel state information measurement.

In some implementations, the channel state information measurement may refer to one of the RSRP, SINR, CQI, RI or PMI.

Clause 16. The method of clause 14, wherein each of the one or more configurations includes information related to a channel state information reporting.

In some implementations, the information may include parameters to report and a resource for carrying the report.

Clause 1715. The method of any of clauses 14 to 16, wherein the one or more configurations are grouped into one or more groups of configurations indicated by a second signaling and each group is associated with corresponding criteria.

Clause 18. The method of any of clauses 14 to 17, wherein, upon satisfaction of the criteria, one reference signal within one configuration or one group of configurations corresponding to the criteria is applied.

In some implementations, the word "applied" can be used to indicate the following examples. If multiple groups of configurations (e.g., CSI-aperiodicTriggerState) are indicated, only one group is mapped to the indication field in DCI once the criteria is satisfied. If only one group of configurations is indicated, and for each configuration, multiple sets of reference signals are configured, and only one set of RSs that belongs to one configuration is applied once the criteria is satisfied if this configuration is selected by the DCI signaling.

Clause 19. The method of clause 18, wherein the criteria include at least one of: a height of the wireless device; an elevation angle of between the wireless device and the network device; a distance between the wireless device and the network device; a service region where the wireless device is in; a duration or window of time; and information associated with the wireless device.

Clause 20. The method of any of clauses 14 to 19, wherein the first signaling and second signaling include at least one of a radio resource control (RRC) or a medium access control (MAC) control element (MAC CE).

Clause 21. The method of clause 14, wherein the channel sounding is triggered by the wireless device by transmitting, to the network device, a trigger message via at least one of a scheduling request (SR), a buffer status report, a physical random access channel (PRACH) resource, a power headroom report (PHR), or a MAC CE signaling.

Here, the word "via" can be used to indicate the following. In an implementation, the trigger message, which is carried by a corresponding channel/signaling listed in this clause as content. In another implementation, the trigger message, which is presented by a corresponding channel/signaling listed in this clause. In this way, the association/mapping between trigger message and channel/signaling is pre-configured or defined. For example, the set or group index can be mapped to a certain PRACH resource.

Clause 22. The method of clause 21, where the trigger message includes at least one of: an index of configuration; a set or group index; an index of transmission configuration indicator (TCI) configuration; a notification; and an index of reference signal.

In some implementation, the notification may indicate the needs for channel sounding from UE side.

Clause 23. The method of any of clauses 21 to 22, further comprising transmitting, by the wireless device, a measurement report following an indication of one configuration after transmitting the trigger message carrying a corresponding index.

Clause 24. The method of any of clauses 21 to 22, further comprising transmitting, by the wireless device, a sounding reference signal (SRS) after transmitting the trigger message carrying a corresponding index.

Clause 25. The method of any of clauses 21 to 22, further comprising receiving, by the wireless device, reference signals following an indication of one configuration after transmitting the trigger message carrying a corresponding index.

Clause 26. The method of clause 21, further comprising receiving, by the wireless device, from the network device, downlink control information (DCI) including a configuration index.

Clause 27. A method of wireless communication, comprising receiving, by a wireless device, from a network device, a first signaling that carries a configuration including a first number of sets of transmission configuration indicator (TCI) states, wherein the first number is greater than or equal to one.

In some implementations, the configuration can be transmitted via RRC.

In some implementations, for each set, the number of TCI can be one or more.

Clause 28. The method of clause 27, wherein each set of TCI states is configured as a list or within a list of TCI states.

Clause 29. The method of any of clauses 27 to 28, further comprising receiving, a second signaling that indicates a second number of sets of TCI states based on the configuration carried via the first signaling.

In some implementations, if one list is configured, the second number of sets may be constructed by selecting TCI within this list by MAC CE, e.g., by MAC CE. If more than one list is configured, the second number of sets may be constructed per list, e.g., by MAC CE. The TCI within each set is used individually.

Clause 30. The method of any of clauses 28 to 29, wherein each TCI state within a TCI set is associated with a TCI bit field in a downlink control indicator (DCI) upon satisfaction of criteria for each set of TCI states.

The association relationship between the indicated set of TCI and a TCI bit field in DCI indicates that the numerical value determined by the TCI bit field in DCI stands for the corresponding TCI state included in the indicated set.

In some implementations, there is a mapping between each paired TCIs within the set to the TCI bit field in DCI, and thus the numerical value determined by the TCI bit field in DCI stands for a paired TCIs (e.g., with same value as pair index). Then, each TCI of the pair will be applied once the associated criteria is satisfied.

Clause 31. The method of any of clauses 27 to 29, further comprising receiving, a third signaling that indicates a set of a pair of TCI states.

In some implementations, if one list is configured, a set of a pair of TCIs can be constructed by selecting TCI within this list by MAC CE, e.g., by MAC CE. If more than one list is configured, a set of a pair of TCIs can be constructed based on all lists. For each pair, one TCI is selected per list. The TCIs within each set are used as combined/coupled/paired TCI.

In some implementations, if one list is configured, a set of a pair of TCIs can be constructed by selecting TCI within this list by MAC CE, e.g., by MAC CE. If more than one list is configured, a set of a pair of TCIs can be constructed based on all lists. For each pair, one TCI is selected per list. The TCIs within each set are used as combined/coupled/paired TCI.

Clause 32. The method of clause 31, wherein each TCI in the pair of TCI states indicated by a TCI bit field in a downlink control indicator (DCI) is applied by the wireless device upon satisfaction of criteria for each TCI within the pair of TCI states.

Clause 33. The method of any of clauses 27 to 28, further comprising receiving a fourth signaling that indicates a set of TCI states.

Clause 34. The method of clause 27, further comprising receiving a fifth signaling that indicates a pair of TCI states.

Clause 35. The method of any of clauses 33 and 34, wherein the wireless device receives the control information according to the TCI within the set or the TCI within the pair of TCI states upon satisfaction of criteria for each TCI.

In some implementations, the control information may include PDCCH that is associated with CORESET.

Clause 36. The method of any of clauses 27 to 35, wherein the criteria include at least one of: a height of the wireless device; an elevation angle of between the wireless device and the network device; a distance between the wireless device and the network device; a service region where the wireless device is in; a duration or window of time; and information associated with the wireless device.

In some implementations, the duration or window of time relates to a time based solution that can include the following operations. A set of valid time windows may be configured, and each item will be valid once the time window is available. Each item will be valid in a sequence and the valid duration is defined. The later item will be valid after the former item with one time offset.

In one example, in case that two TCIs are paired as a combination, the first TCI in the pair will be valid (e.g., after a certain time offset) by receiving the configuration (e.g., MAC CE) or indication (e.g., DCI). Then, after an additional time offset, the second TCI will be applied by the wireless device for reception or transmission.

Clause 37. The method of any of clauses 27 to 36, wherein the wireless device is configured to receive or transmit a channel or a reference signal in a frequency resource corresponding to a reference signal included in an indication for quasi co location (QCL) information.

In some implementations, the wireless device may switch the resource for receiving/transmitting signals or data according to the indication for quasi-co-location (QCL)

information, which can be applied for either the legacy mechanism or the configuration disclosed in this patent document.

In the legacy system, a de-coupled mechanism is defined to switch the BWP and the beam, e.g., via different code-points in DCI. For some cases, e.g., NTN (non-terrestrial network, via either HAPS or satellite), there is a potential coupling between the frequency used for transmission/reception and the beams. Then, the corresponding switching can be done by coupling the BWP and the beam (i.e., via TCI signaling). In each TCI state, up to two reference signals along with one QCL-Type (which is used to indicate the certain channel properties) may be included.

In some implementations, the indication for QCL information may include TCI or spatial-relationship.

Clause 38. The method of clause 37, where the reference signal includes one reference signal that is associated with channel characteristics in a spatial domain included in one TCI state.

In some implementations, the channel characteristics in a spatial domain may include QCL type D.

Clause 39. An apparatus for wireless communication, comprising a processor, wherein the processor is configured to implement a method recited in any of clauses 1 to 38.

Clause 40. A computer readable program storage medium having code stored thereon, the code, when executed by a processor, causing the processor to implement a method recited in any of clauses 1 to 38.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wireless communication, comprising:

receiving, by a wireless device, from a network device, a plurality of configurations including: one or more first parameters including a threshold value for comparison with a channel measurement value; and one or more second parameters for determining a reference signal among a plurality of candidate reference signals included in a reference signal list; and initiating, by the wireless device, a process to recover a link to a network based on information elements within one or more configurations selected from the plurality of configurations, wherein the one or more configurations are selected based on criteria including at least one of: a height of the wireless device; an elevation angle between the wireless device and the network device; a distance between the wireless device and the network device; or a service region where the wireless device is in.

2. The method of claim 1, wherein the wireless device receives the plurality of configurations via at least one of a radio resource control (RRC), a system information block (SIB), or a medium access control (MAC) control element (MAC CE).

3. A method of wireless communication, comprising:
receiving, by a wireless device, from a network device, a first signaling that carries a plurality of configurations for channel sounding; and
performing by the wireless device a channel sounding operation based on one or more configurations selected from the plurality of configurations,
wherein the one or more configurations are grouped into one or more groups of configurations indicated by a second signaling, and
wherein the one or more configurations are selected based on criteria including at least one of: a height of the wireless device; an elevation angle between the wireless device and the network device; a distance between the wireless device and the network device; or a service region where the wireless device is in.

4. The method of claim 3, wherein each of the plurality of configurations includes a reference signal list including one or more sets of reference signals for a channel state information measurement.

5. The method of claim 3, wherein each of the plurality of configurations includes information related to a channel state information reporting.

6. The method of claim 3, wherein each group is associated with corresponding criteria, and wherein, upon satisfaction of the corresponding criteria, one reference signal within one configuration or one group of configurations corresponding to the corresponding criteria is applied.

7. The method of claim 3, wherein the first signaling and second signaling include at least one of a radio resource control (RRC) or a medium access control (MAC) control element (MAC CE).

8. The method of claim 3, wherein the channel sounding is triggered by the wireless device by transmitting, to the network device, a trigger message via at least one of a scheduling request (SR), a buffer status report, a physical random access channel (PRACH) resource, a power headroom report (PHR), or a MAC CE signaling.

9. A method of wireless communication, comprising:
receiving, by a wireless device, from a network device, a first signaling that carries a configuration including a first number of sets of transmission configuration indicator (TCI) states, wherein the first number is greater than or equal to one;
receiving, a second signaling that indicates a second number of sets of TCI states based on the configuration carried via the first signaling; and
receiving, a third signaling that indicates a set of a pair of TCI states, wherein each TCI in the pair of TCI states indicated by a TCI bit field in a downlink control indicator (DCI) is applied by the wireless device upon satisfaction of criteria for each TCI within the pair of TCI states.

10. The method of claim 9, wherein each set of TCI states is configured as a list or within a list of TCI states.

11. The method of claim 10, wherein each TCI state within a TCI set is associated with a TCI bit field in a downlink control indicator (DCI) upon satisfaction of criteria for each set of TCI states.

12. The method of claim 11, wherein the criteria include at least one of:
a height of the wireless device;
an elevation angle of between the wireless device and the network device;
a distance between the wireless device and the network device;
a service region where the wireless device is in;
a duration or window of time; or
information associated with the wireless device.

13. The method of claim 9, wherein the wireless device is configured to receive or transmit a channel or a reference signal in a frequency resource corresponding to a reference signal included in an indication for quasi co location (QCL) information.

* * * * *